US008237751B2

(12) United States Patent
Belik

(10) Patent No.: US 8,237,751 B2
(45) Date of Patent: Aug. 7, 2012

(54) MULTI-PRIMARY CONVERSION

(75) Inventor: Oleg Belik, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 312 days.

(21) Appl. No.: 12/667,067

(22) PCT Filed: Jun. 30, 2008

(86) PCT No.: PCT/IB2008/052614
§ 371 (c)(1),
(2), (4) Date: Dec. 29, 2009

(87) PCT Pub. No.: WO2009/004562
PCT Pub. Date: Jan. 8, 2009

(65) Prior Publication Data
US 2010/0207965 A1  Aug. 19, 2010

(30) Foreign Application Priority Data
Jul. 4, 2007  (EP) .................................... 07111714

(51) Int. Cl.
*G09G 5/10* (2006.01)
(52) U.S. Cl. ........................... 345/690; 345/88; 345/589
(58) Field of Classification Search .................... 345/88, 345/589, 690–694
See application file for complete search history.

(56) References Cited
U.S. PATENT DOCUMENTS
6,342,897 B1 * 1/2002 Wen ............................... 345/589

FOREIGN PATENT DOCUMENTS
EP  1484748 A1  12/2004
(Continued)

OTHER PUBLICATIONS
Ajito et al: "Color Conversion Method for Multiprimary Display Using Matrix Switching"; Optical Review, vol. 8, No. 3, 2001, pp. 191-197.

*Primary Examiner* — Kimnhung Nguyen

(57) ABSTRACT

A method converts an input pixel (IPi) defined by three values (ri, gi, bi) of input primaries (RI, GI, BI) into N drive values (DSi) for driving N sub-pixels (SPi) of a pixel (PIi) of a display device (DD). The N drive values (DSi) have a valid range (VR) wherein their values occur. The N sub-pixels (SPi) emit light defined by N display primaries (DPi) of which at least four are independent. M resulting display primaries (RDi) are used (10) wherein a group of ones of the N display primaries (DPi) which are combined into a combined display primary (CDi) are replaced by the combined display primary (CDi). A first multi-primary conversion (MPC1) is performed (11) on the input pixel (IPi) to obtain resulting drive values (DRi) for the M resulting display primaries (RDi). It is checked (12) whether the M resulting drive values (DRi) have values in the valid range (VR). If the resulting drive value (DRi) of at least one of the M resulting display primaries (RDi) has a value outside the valid range (VR) the method allocates (12) a fixed value (FVi) to the resulting drive value (DRi) outside the valid range (VR), and selects (13) K out of the N display primaries (DPi). The selection includes the ones of the N display primaries (DPi) which were combined into a combined display primary (CDi) but not the display primaries (DPi) associated with the resulting drive value (DRi) outside the valid range (VR). The integer K is larger than 3. Finally the method performs (14) a second multi-primary conversion under a constraint (CO2) for the ones of the N display primaries (DPi) being combined into a combined display primary (CDi) in the first multi-primary conversion (MPC1).

13 Claims, 5 Drawing Sheets

FOREIGN PATENT DOCUMENTS

| | | |
|---|---|---|
| WO | 9510160 A1 | 4/1995 |
| WO | 2006030351 A1 | 3/2006 |
| WO | 2006106457 A1 | 10/2006 |
| WO | 2006126118 A2 | 11/2006 |

* cited by examiner

MULTI-PRIMARY CONVERSION

FIELD OF THE INVENTION

The invention relates to a method of converting an input pixel defined by three values of three input primaries into N pixel drive values for driving N sub-pixels of a pixel of a display device, and to a software program for performing the method. The invention further relates to a converter for converting an input pixel defined by three values of three input primaries into N pixel drive values for driving N sub-pixels of a pixel of a display device.

BACKGROUND OF THE INVENTION

WO95/10160 discloses a video display apparatus which receives a transmitted color video signal being coded using three system primaries, and which decodes the signal for display on a device using four display primaries. The four display primaries are independent in that no display primary can be expressed as a combination of another two of the display primaries, and thus define a quadrilateral. A fifth, imaginary display primary is determined which is a linear combination of the third and the fourth display primaries. Now, the quadrilateral is divided into three triads defined by respectively the first and fourth and fifth, the first and fifth and second, and the second and fifth and third display primaries. The received video signal is decoded by three matrix arithmetic units, one for each triad, to calculate drive signals for the first to fourth display primaries. For each pixel, the matrix arithmetic unit output producing no negative display drive signal is selected to drive the four-primary display device. Thus, for a particular input pixel of the input signal the triad is selected which enables to display the input pixel color.

In an embodiment of this prior art, the following steps are performed. Firstly, the fifth display primary is determined as a linear combination of the third and fourth display primaries. Secondly, the signals for generating the first, second and fifth display primaries are calculated using a triad of display primaries comprising the first, second and fifth display primaries. Thirdly, if the signals calculated are all either zero or positive, the signals for the first and the second display primaries are used to form display primary drive signals, and the drive signals for the third and the fourth display primaries are calculated by using the signal for the fifth display primary to calculate drive signals for the third and the fourth display primaries according to the linear relationship between them. Fourthly, if the signal calculated for the first display primary is negative, display primary drive signals are initially calculated is if they are all either zero or positive, and then the second and fourth display primary drive signals calculated are modified by the addition of predetermined multiples of the first display primary drive signal thereto and the first display primary signal is set to zero. A similar approach is followed if the signal calculated for the second display primary is negative.

In the prior art, the fifth primary is introduced to be able to generate the triads. The computations in each one of the triads are simple because in each triad the three primary input signal is deterministically converted into a three primary display signal. However, the prior art approach has the drawback that discontinuities may occur across borders between different triads. If in the now following the term multi-primary is used, it indicates that more than three display primaries are present.

SUMMARY OF THE INVENTION

It is an object of the invention to decrease discontinuities across triad borders.

A first aspect of the invention provides a method as claimed in claim 1. A second aspect of the invention provides a converter as claimed in claim 11. A third aspect of the invention provides a computer program product as claimed in claim 12. Advantageous embodiments are defined in the dependent claims.

A method in accordance with the first aspect of the invention converts an input pixel defined by three values of three input primaries into N drive values for driving N sub-pixels of an output pixel of a display device. N is an integer larger than 3. The input signal comprises a sequence of input pixels which have to be displayed on respective pixels of a display device. The input pixels of the input signal are defined with respect to three input primaries. The display pixels comprise N>3 sub-pixels which emit light defined by N>3 independent display primaries. Although not further addressed, the display pixels may comprise further sub-pixels which have dependent display primaries. For the ease of explanation, in the now following it is assumed that all the sub-pixels of the pixel have independent display primaries. Thus, the three values which define the contribution of the three input primaries of the input pixel have to be converted into N drive values for the N sub-pixels of the display pixel.

The N drive values all have a same valid range wherein their values are valid. In all practical implementations, the drive values can only have values within a limited range. For example, in an analog implementation, the voltages which can be generated are limited by the power supply voltage(s) used. In a digital implementation the values are limited by the number of bits used to represent the digital words. This limited range is defined to be the valid range, because drive voltages outside the valid range cannot be generated in the practical implementation. In the now following the valid range is normalized to the range from zero to one including the border values.

The method uses M resulting display primaries instead of the N display primaries, wherein M is an integer smaller than the integer N. The M resulting display primaries are obtained by combining ones of the N display primaries into a combined display primary and replacing the display primaries which are combined by the combined display primary. The combined display primary may be generated as a linear combination of the display primaries which are combined. The M resulting display primaries may be pre-stored or may be determined by a step of the present method.

Next, a multi-primary conversion is applied on the input pixel to convert the three primary input signal to the M primary resulting drive values for the M resulting display primaries. Then, it is checked whether the M resulting drive values have values in the valid range. If all the resulting drive values are within the valid range, the M resulting display primaries can be used to represent the color of the input pixel. The N display drive values to drive the N display primaries are derived from the M primary resulting drive values based on the combining ratios used to create the combined display primary. If the resulting drive value of a display primary has a value outside the valid range the following steps are performed. Firstly, to the resulting drive value outside the valid range a fixed value is allocated. If more than one resulting drive value have a value outside the valid range, to at least one of them a fixed value is allocated. Secondly, K (3<K<N) out of the N display primaries are selected. The selection includes the ones of the N display primaries being combined into the combined display primary but not the display primaries associated with the resulting drive value which is outside the valid range. The K selected display primaries are selected such that the representation of the color of the input pixel is possible:

the input pixel lies within the color gamut spanned by the selected display primaries. It has to be noted that only after the 3 to K multi-primary conversion (the third step, yet to be discussed) it becomes clear whether the input color can be represented by these K primaries. Thirdly, a second multi-primary conversion is performed under the constraint that the ones of the N display primaries which were combined into a combined display primary in the first multi-primary conversion have equal drive values. However any other constraints may also be applicable, such as for example a minimum degradation constraint for an OLED display.

It is possible to apply a constraint because the multi-primary conversion converts the input pixel which is defined with respect to three input primaries into K (more than three) drive values associated with K virtual display primaries. The K virtual display primaries may comprise real display primaries and combinations of real display primaries. Such a three to K multi-primary conversion can be performed efficiently without the use of look up tables, as is described in European Patent Application No. 05102641.7. The 3 to K multi-primary conversion is especially efficient if K=4.

If the constraint is an equal drive value constraint, the multi-primary conversion provides that out of all the possible solutions for the three to K primary conversion the one is selected whereby the drive values, which had almost identical or identical drive values because the associated display primaries were combined, keep their identical values over the border of the gamut created by the M resulting display primaries. Thus, at a particular selection of a combination of the display primaries, a particular gamut results. If the input pixel has a color within this gamut but near to the border of the gamut, the drive values of all the combined display primaries are known. If the combination is a linear combination wherein all contributing display primaries have the same weight, their drive values are the most identical. If another input pixel has a color near to the color of the previously mentioned input pixel but just outside the previously mentioned gamut, a new set of display primaries (real and/or combined) have to be selected such that this latest color can be represented. Because of the different set of display primaries used a discontinuity may occur if no further constraints are used. In a deterministic three to three primary conversion it is impossible to apply a constraint. Consequently, this approach may cause artifacts for very similar colors which lie at different sides of a border of a triad gamut. In accordance with the present invention, not another triad is selected but a quadrilateral. Now a three to four primary conversion is required in which it is possible to input a useful constraint to find an optimal solution out of many possible solutions. A very useful constraint for preventing discontinuities is the equal drive constraint for drive values of real display primaries which were combined. As said, other constraints that provide an optimal solution for a particular primary (or combined primary) or a group of primaries prevent discontinuities as well.

In an embodiment, the M resulting display primaries further comprise another group of ones of the N display primaries which are combined into a further combined display primary. In the multi-primary conversion the ones of the N display primaries which are combined are replaced by the further combined display primary to facilitate an easy three to four multi-primary conversion. The selection of the four out of the N display primaries includes the further combined display primary. This approach is especially relevant if more than six display primaries exist. Now more than two of the N display primaries have to be combined in one group, or more groups of combined display primaries have to be used. In an embodiment always only two closest display primaries are grouped to keep the resulting gamut as large as possible.

In an embodiment, exactly four resulting display primaries are used. The four resulting display primaries are obtained by combining a number of the N display primaries in at least one group. The first multi-primary conversion is now performed under a constraint that display primaries contributing to a same combined display primary have equal drive values. Thus, now both the first and the second multi-primary conversion use the equal drive value constraint, thereby further decreasing discontinuities over the borders of the adjacent sub-gamuts. Again, it has to be noted that any other constraint may be used.

In an embodiment, a display field comprises a sequence of a first frame having first display primaries and a second frame having second display primaries. The first display primaries and the second display primaries form the N display primaries. Usually, the display field comprises a sequence of input pixels which should be displayed on a corresponding matrix of display pixels. Or said differently, the field of the input pixels comprises input colors to be displayed on the complete matrix of display pixels. For example, in a LCD apparatus the different primaries for the different display frames may be obtained by using different light sources per frame or by changing the spectrum of the light emitted by the backlight unit per frame, or by using different color filters per frame. Now, it is even more important to be able to implement the equal drive constraint during the multi-primary conversion to also prevent cross talk.

In an embodiment, the number of the first display primaries equals the number of the second display primaries. The M=N/2 resulting display primaries replace the N display primaries by combining N/2 nearest pairs of the N display primaries out of different frames. Thus, the two nearest display primaries out of different frames are combined in a single combined display primary. This approach provides the largest possible gamut with the combined display primaries.

In an embodiment, wherein N is equal to six, the three combined resulting display primaries replace the six display primaries. The first mentioned multi-primary conversion is preceded by the following steps. First the multi-primary conversion converts the input pixel to three drive values for the three combined display primaries. Secondly the checking determines whether the three drive values have values in the valid range. If at least one of the three drive values has not a valid value a fixed value is allocated to the invalid drive value, and four out of the six display primaries are selected. The selection does not include the display primaries associated with the invalid drive value. The four selected display primaries are selected enabling display of the color of the input pixel after the multi-primary conversion has been applied.

In an embodiment, the nearest border value of the valid range is allocated as the fixed value to the drive value outside the valid range.

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
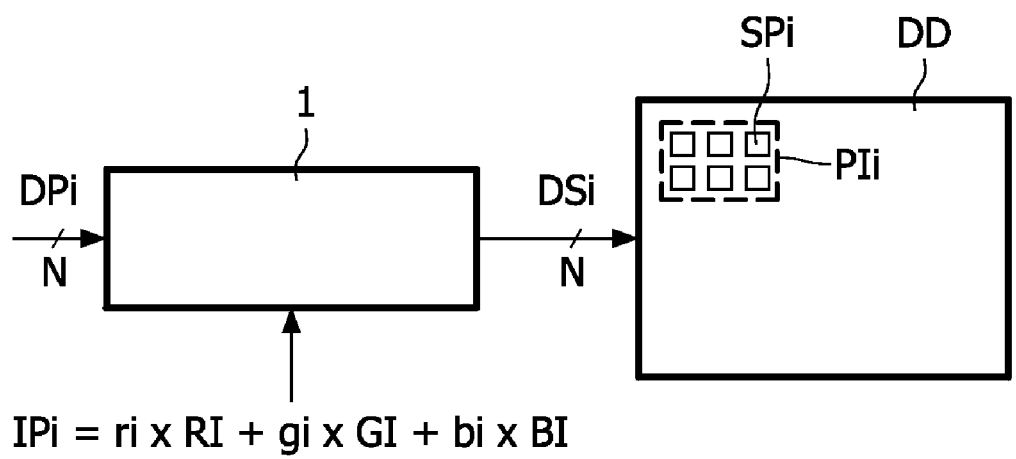
FIG. 1 schematically shows a display apparatus with a converter for converting a three primary input signal to a multi-primary drive signal, FIG. 2 schematically shows a block diagram of an embodiment of a converter for converting a three primary input signal into a multi-primary drive signal, FIG. 3 schematically shows an example of a gamut created by five independent display primaries, FIG. 4 schematically shows one field of a spectrum sequential display, FIG. 5 schematically shows a block diagram of an embodiment of a converter for converting a three primary input signal into two times three display primaries, and FIG. 6 schematically shows an example of a gamut created by two times three display primaries of a spectrum sequential display.

FIG. 1 schematically shows a display apparatus with a converter for converting a three primary input signal to a multi-primary drive signal. The display apparatus comprises the converter 1 and a display device DD.

The display device DD comprises pixels PIi which comprise N sub-pixels SPi. For clarity, only one pixel PIi is shown. Usually, the display device is able to display images and comprises a plurality of pixels PIi arranged in a matrix like structure. It has to be noted that the index i is used to indicate the item indicated by the preceding letters in general for a plurality of these items. For example, the pixel PIi is any one of the pixels PI or refers to the pixels PI in general. The sub-pixels SPi of the pixel PIi emit different light forming the display primaries DPi. Each one of the sub-pixels SPi is driven with a pixel drive value DSi. In the example shown, the pixels PIi comprise N equal to six sub-pixels SPi and thus six pixel drive values DSi are required.

The input signal comprises input pixels IPi defined by three values ri, gi, bi of the three input primaries RI, GI, BI which have to be converted into the N pixel drive values DSi per pixel PIi. In the prior art this conversion may be performed directly, which requires a difficult multi-primary conversion requiring a lot of storage (look up table) or a high amount of calculations. Alternatively, as disclosed in WO95/10160, the output gamut spanned by the display primaries DPi is divided into triads, and the triad is selected in which the input color can be represented with valid drive values. However, this approach may cause discontinuities between similar colors in different triads.

In the present invention, the converter 1 processes the N display primaries DPi to provide a number of M drive values DRi which is lower than the number N of display primaries DPi, and thus needs to perform a multi-primary conversion from the three input primaries RI, GI, BI to the M drive values DRi. The M drive values DRi have to be converted into the N pixel drive values DSi. The operation of the converter 1 will be elucidated in more detail with respect to the other Figures.

Figure 2:
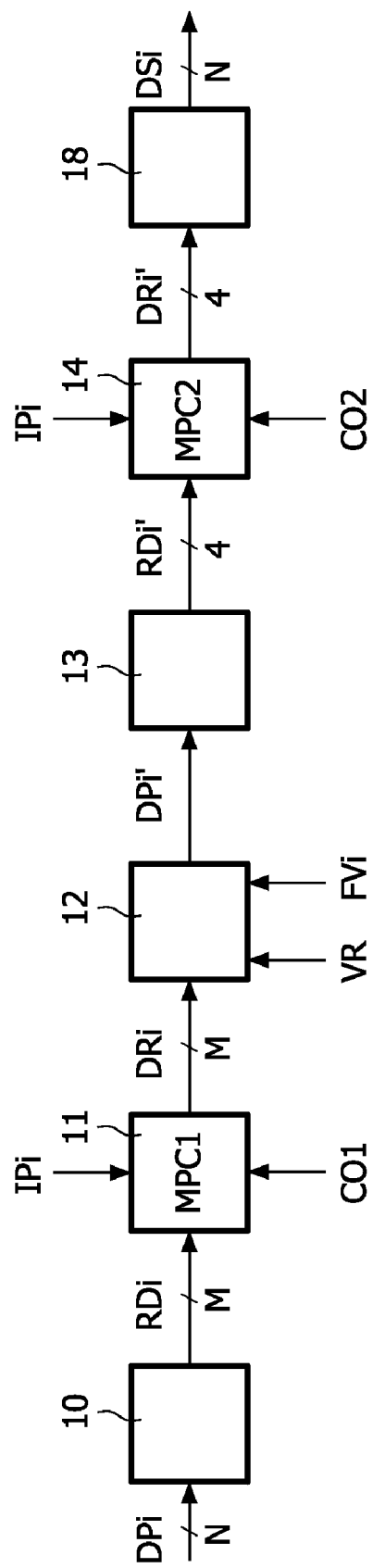

FIG. 2 schematically shows a block diagram of an embodiment of a converter for converting a three primary input signal into a multi-primary drive signal. The converter 1 comprises a selection unit 10, a multi-primary converter 11 also referred to as MPC1, a checking and allocating unit 12, a selection unit 13, a multi-primary converter 14 also referred to as MPC2, and a driver 18.

The selection unit 10 provides the M resulting display primaries RDi, which contain a sub-set of the N display primaries DPi and combined primaries that are created from the N display primaries DPi. M is an integer smaller than the integer N. At least one of the M resulting display primaries RDi is obtained by combining particular ones of the N display primaries DPi into a combined display primary CDi. Such a combined display primary CDi is the combination of at least two of the N display primaries DPi. The display primaries DPi which are combined into the combined display primary CDi are replaced by the combined display primary CDi. The combined display primary CDi may be generated as a linear combination of the display primaries DPi which are combined. The M resulting display primaries RDi may be pre-stored in a memory of the selection unit 10 or may be determined by the selection unit 10 from the display primaries DPi. Thus, the selection unit 10 lowers the amount of display primaries DPi to be used in the multi-primary conversion 11 from N to M. However, for independent display primaries DPi, the color gamut spanned by the resulting display primaries RDi is smaller than the gamut spanned by the display primaries DPi which are also referred to as the real display primaries DPi.

Next, the multi-primary converter 11 performs a multi-primary conversion MPC1 on the input pixel IPi to convert the three primary input pixel IPi to the M primary resulting drive values DRi for the M resulting display primaries RDi. This multi-primary converter 11 may convert the three primary input pixel IPi into 3 or more resulting drive values DRi. If the number of resulting drive values DRi is larger than 3, the conversion may be performed under a constraint CO1. For example, the constraint may be an equal luminance constraint or an equal drive value constraint for combined display primaries DPi. However, in the multi-primary conversion 11 any desired constraint CO1 for the drive values DRi may be used.

Next, the checking and allocating unit 12 checks whether the M resulting drive values DRi have values in the valid range VR. If all the resulting drive values DRi are within the valid range VR, the M resulting display primaries RDi can be used to represent the color of the input pixel IPi being processed. In order to obtain the N drive values of the N real display primaries from M valid drive values, combining ratios are used. When N drive values are determined the 3 to N conversion for an input color is ready. However, if the resulting drive value DRi of at least one of M primaries RDi has a value outside the valid range VR, the following steps are performed.

Firstly, the checking and allocating unit 12 allocates a fixed value FVi to the resulting drive value DRi outside the valid range VR which results in an amended set of display primaries DPi'. If the fixed value FVi is allocated to a combined drive value, then automatically, using the combining ratios, fixed values are allocated to all the drive values being combined.

Secondly, the selection unit 13, selects (similarly to the selection unit 10) a sub-set RDi' of the display primaries DPi' which do not comprise the display primaries DPi for which the drive value have a fixed value FVi. It is not relevant to the invention whether the checking and allocating unit 12 provides the limited set of display primaries DPi' or all the display primaries DPi and information indicating which one(s) is or are not selectable. In the example shown in FIG. 2, the sub-set RDi' comprises exactly four display primaries selected (real) and or created (combined) out of the display primaries DPi'. The selection RDi' includes the ones of the N display primaries DPi which were combined into the combined display primary CDi but not the display primaries DPi associated with the resulting drive value DRi which is outside the valid range VR. The four selected display primaries RDi' are selected such that the representation of the color of the input pixel IPi is possible. Or said differently, the input pixel IPi lies within the color gamut spanned by the selected four display primaries RDi'. It has to be noted that it is not known in advance whether RDi' can represent the input color. Only after the second multi-primary conversion MPC2 has been performed it is known whether any drive values DRi' are negative. That is why an iterative algorithm may be used, which tries different (or all) possible combinations of the primaries DPi' and chooses the best result based on the outcome after the multi-primary conversion MPC2.

Thirdly, the multi-primary converter 14 performs the multi-primary conversion MPC2 under the constraint CO2 that the ones of the N display primaries DPi which were combined into a combined display primary CDi before the first multi-primary conversion 11 have minimal different (preferably equal) drive values, or have a minimally different luminance. It is possible to apply the constraint CO2 because the multi-primary conversion 14 converts the input pixel IPi which is defined with respect to three input primaries RI, GI, BI into four drive values DRi' associated with the four display primaries RDi'. The four display primaries RDi' may comprise real display primaries DPi and combinations CDi of real display primaries DPi. Such a three to four multi-primary conversion MPC2 can be performed efficiently without the use of look up tables, this is described in European Patent Application No. 05102641.7.

The use of this constraint CO2 has the effect that out of all the possible solutions for the three to four primary conversion the one is selected whereby the drive values DRi', which had almost identical or identical drive values because the associated display primaries were combined, keep their identical values as much as possible over the border of the gamut created by the M selected display primaries DPi'. Thus, at a particular selection of a combination CDi of the display primaries DPi, a particular gamut results. If the input pixel IPi has a color within this gamut but near to the border of the gamut, the drive values DRi' of all the combined display primaries CDi are known. If the combination is a linear combination wherein all contributing display primaries DPi to the combined display primary CDi have the same weight, their drive values are the most identical. If another input pixel IPi has a color near to the color of the previously mentioned input pixel IPi but just outside the previously mentioned gamut, a new set of display primaries (real DPi and/or combined CDi) have to be selected such that this later mentioned color can be represented. Because of the different set of display primaries DPi' required for the later mentioned color a discontinuity may occur if no further constraint CO2 is used. In a deterministic three to three primary conversion it is impossible to apply a constraint. Consequently, this prior art approach may cause artifacts for very similar colors which lie at different sides of a border of a triad gamut. In accordance with the present invention, not another triad is selected but a quadrilateral. Now a three to four primary conversion is required in which it is possible to input the constraint CO2 for drive values of real display primaries DPi which were combined to define an optimal solution out of many possible solutions for the multi-primary conversion MPC2.

In the example shown in FIG. 2 the display pixels have 4 sub-pixels which form the four display primaries DPi, and thus a three to four multi-primary conversion MPC2 is required. If the pixels have N sub-pixels with N representing N independent display primaries, a three to N multi-primary conversion MPC2 is implemented. The constraint CO2 may be any other suitable constraint.

If more than one of the resulting drive values DRi are out of the valid range VR, the iterative algorithm may be implemented wherein the allocating 12, the selecting 13 and the performing 14 is performed iteratively for each drive value DRi outside the valid range by: allocating 12 a fixed value FVi to the resulting drive value DRi outside the valid range VR; selecting 13 K out of the N display primaries DPi, the selection including ones of the display primaries DPi combined into the combined display primary CDi, but not the display primaries DPi associated with the for this iteration selected resulting drive value DRi outside the valid range VR; performing 14 the second multi-primary conversion with the equal drive or luminance constraint CO2 to obtain the drive values DRi'.

The converter further comprises a decision block 15 which determines a difference between the drive values DRi' or luminances of the display primaries which are combined into combined primaries CDi, and selects the drive values DRi' associated with the drive value DRi outside the valid range which provides the minimal difference.

The driver 18 receives the four drive values DRi' and supplies the N drive values DSi to the N sub-pixels SPi of the pixel PIi. The driver 18 further receives information on which drive values DSi should get a fixed value FVi within the valid range VR because they were not within the valid range VR, and which display primaries DPi were how combined, to be able to calculate the correct drive values DSi of the separate display primaries DPi which were combined in a combined display primary CDi.

Figure 3:
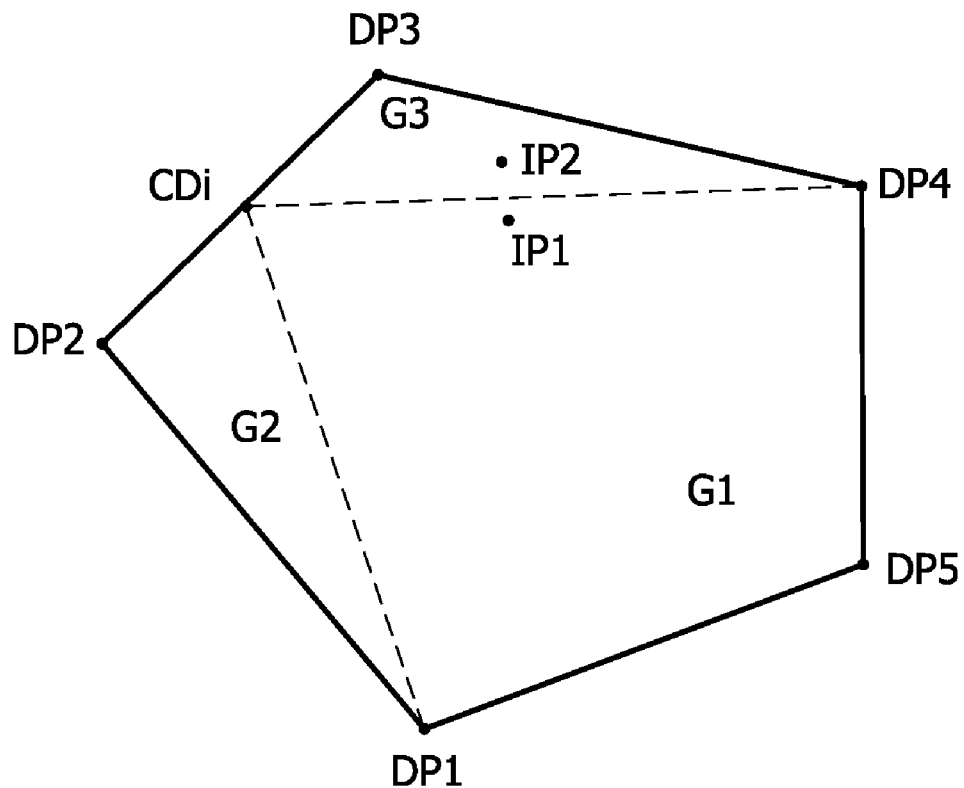

FIG. 3 schematically shows an example of a gamut created by five independent display primaries. The five independent display primaries are DP1, DP2, DP3, DP4 and DP5. The display primaries DP2 and DP3 are combined in a combined display primary CDi. In the embodiment shown, the display primary CDi divides the line DP2, DP3 in two equal parts. The gamut G1 is defined by the display primaries DP1, CDi, DP4 and DP5, the gamut G2 is defined by the display primaries DP1, DP2 and CDi, and the gamut G3 is defined by the display primaries DP3, DP4, CDi. It has to be noted that the combined display primary CDi is also referred to as a display primary although it is not a real display primary. Further, it has to be noted that the gamut G1 occurs if both the display primaries DP2 and DP3 have the same drive value.

In the now following, the operation of the circuit shown in FIG. 2 is elucidated based on the example of the display primaries shown in FIG. 3. The selection unit 10 creates out of the five display primaries DP1 to DP5 the four resulting display primaries RDi which in this example are DP1, CDi, DP4 and DP5. The multi-primary converter 11 converts the input pixels IPi defined with respect to the three input primaries RI, GI, BI into four drive values DRi of the four resulting display primaries RDi which are the real display primaries DP1, DP4, DP5 and the combined display primary CDi. The checking and allocating unit 12 checks for all the four drive values DRi whether they are within the valid range VR, or said differently: whether they have valid values in the actual implementation. If for the input pixel IP1 all four drive values DRi have valid values, the drive values DRi supplied by the multi-primary convertor 11 can be supplied to the driver 18 which uses the information on the combining ratio (weights) between the display primaries DP2 and DP3. However, this situation is not further relevant for the present invention.

The present invention is directed to how to handle the situation that the present input pixel IPi is not within gamut G1, but, for example is the input pixel IP2 within the gamut G3. Now, the difference with respect to the prior art is discussed Now, the unit 12 detects that, for example, the drive value for the display primary DP1 is negative and allocates a fixed value FVi within the valid range to the display primary DP1. In an embodiment, the fixed value FVi is equal to zero if the drive value for the display primary DP1 is negative or one if the drive value for the display primary DP1 is larger than one. The unit 12 supplies the amended set of display primaries DPi' which in fact are the display primaries DPi in which the one of which the associated drive value DRi does not have a valid value is not selectable any more by the selection unit 13. This one may not be included in the set DPi' or may be included with an indication that it is not anymore selectable. If more than one of the drive values DRi has a value outside the valid range VR, all or a selection out of these drive values DRi gets a fixed value FVi. Different drive values DRi with invalid values may get the same or different fixed values FVi.

In an embodiment, if more than one drive value is out of the valid range an iterative approach is used. This iterative algorithm allocates a fixed value to only one invalid value and selects other primaries that have invalid values in the selection unit 13. After the multi-primary conversion MPC2 a measure of optimality can be evaluated and stored for this particular selection. At the second iteration a fixed value is allocated to another one of the primaries having an invalid value and the selection unit 13 chooses a different sub-set of primaries. After the multi-primary conversion MPC2, the second measure of optimality is stored, and so on. After all the iterations, the selection and the fixed primary that gave the best measure of optimality are selected as the result of the conversion.

The selection unit 13 selects a sub-set RDi' of exactly four display primaries RDi' out of the selectable ones in the set DPi'. The four display primaries RDi' are selected (real) and/or created (combined) out of the display primaries DPi'. The selection RDi' includes the ones of the N display primaries DPi which were combined into the combined display primary CDi, but not the display primary DP1 associated with the resulting drive value DRi which is outside the valid range VR. The four selected display primaries RDi' are selected such that the representation of the color of the input pixel IP2 is possible. Thus, in the example shown in FIG. 3, the four selected display primaries RDi' are DP2, DP3, DP4 and DP5. However, because usually it is not know in advance (before performing the multi-primary conversion MPC2) that the selected display primaries RDi' are the correct ones enabling to display the color, usually, the above described iterative algorithm is used.

The multi-primary converter 14 performs the multi-primary conversion under the constraint CO2 that the ones of the N display primaries DP2 and DP3 which were combined into a combined display primary CDi before the first multi-primary conversion 11 have equal drive values or the smallest difference, or that the resulting luminances are equal or have the smallest difference. Although in this example, the four display primaries RDi' all are real display primaries DPi, in other examples, also one or more combinations CDi of real display primaries DPi may be present in the four selected display primaries RDi'. The multi-primary converter 14 supplies the drive values DRi' for the four selected display primaries RDi'.

The driver 18 receives the four drive values DRi' and supplies the N drive values DSi to the N sub-pixels SPi of the pixel PIi The drive values DSi of the real display primaries DPi in the set of the four selected ones can be used directly for driving the corresponding sub-pixels SPi. In this example this are all four selected ones. If in the set of selected ones a combined display primary CDi is present, the value of the display primaries DPi which are combined can be calculated because the algorithm which was used for combining is known. In the example shown, the drive values DSi for the primaries DPi which were combined would be identical to the drive value DRi' for the combined primaries CDi. The driver 18 further receives information on which drive values DSi should get a fixed value FVi because they were not within the valid range VR.

Figure 4:
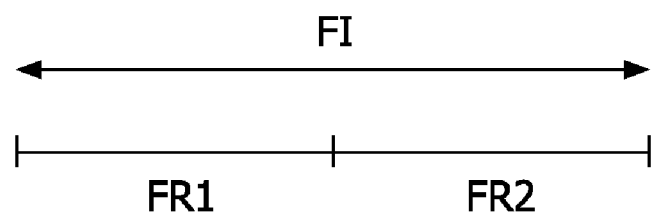

FIG. 4 schematically shows one field of a spectrum sequential display. For example, a spectrum sequential display displays each image during one field FI which comprises two frames FR1 and FR2. For example, the field FI repetition rate is 60 Hz and the frame repetition rate is 120 Hz. The display primaries DPi during the two frames FR1 and FR2 are different to enlarge the total gamut displayable.

For example, a conventional RGB display panel may be used which can be driven at the double frame rate. A modified backlight comprises two types of fluorescent lamps or LEDs. One type of the lamps in combination with the color filters of the display panel generates the first set of three display primaries DPi during the frame FR1. The other type of the lamps in combination with the color filters of the display panel generates the second set of three display primaries DPi during the frame FR2. The enlarged gamut is thus defined by the combination of two times three display primaries DPi, thus by six display primaries DPi.

Figure 5:
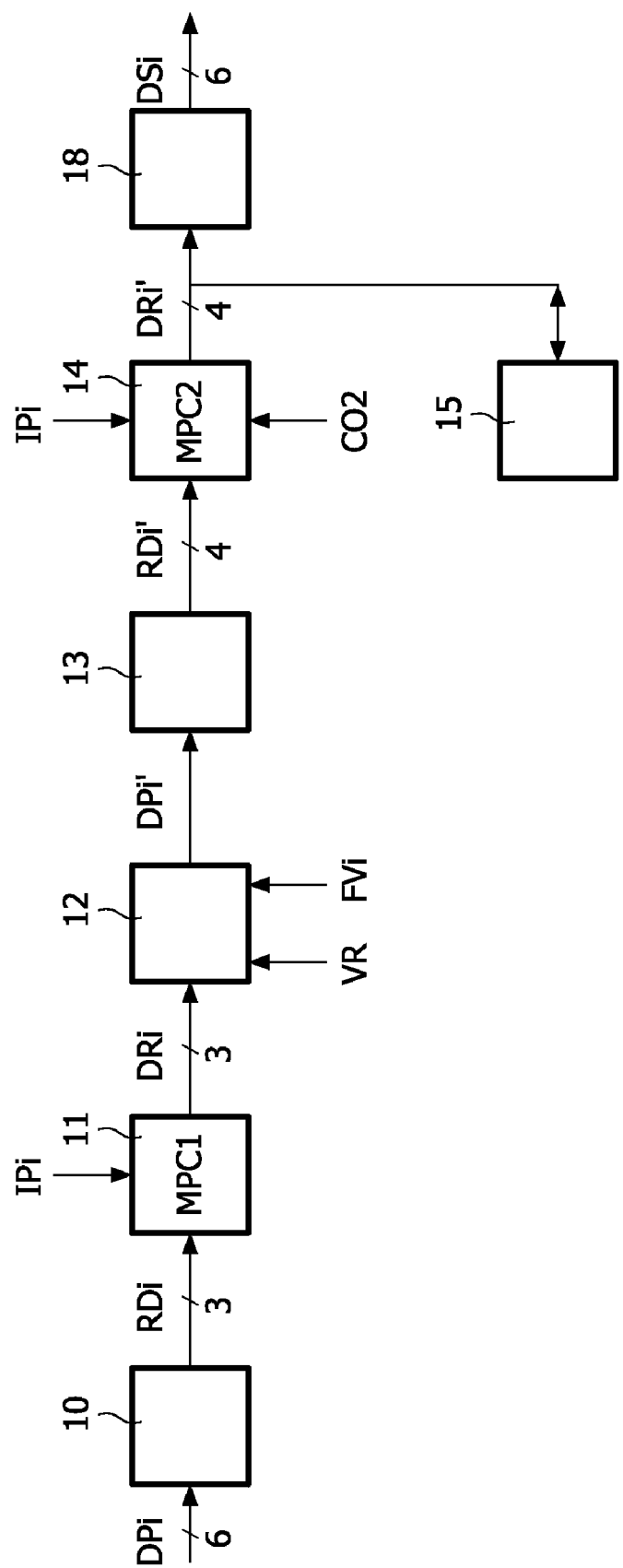
Figure 6:
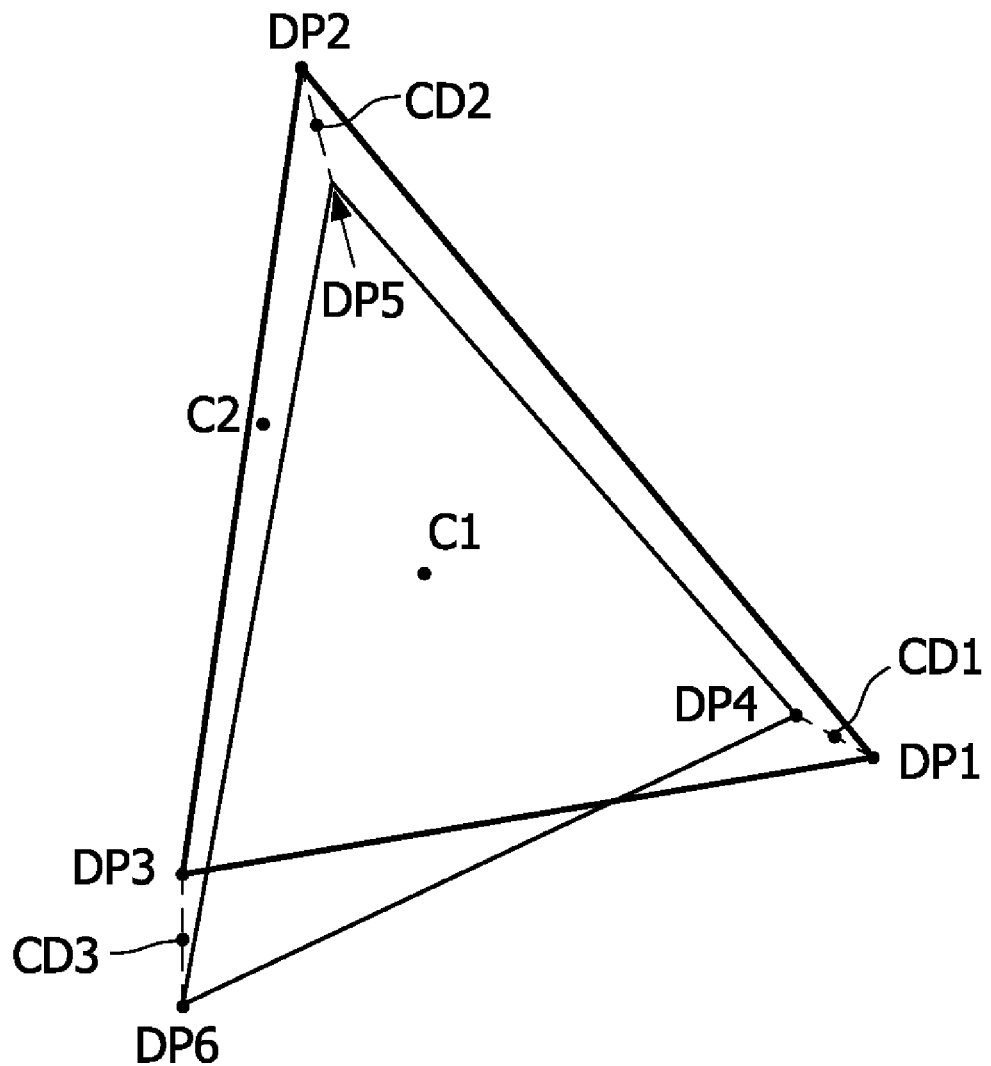

An example of an approach in accordance with the present invention for a spectrum sequential display is elucidated with respect to the block diagram shown in FIG. 5 and the two groups of three display primaries shown in FIG. 6.

FIG. 5 schematically shows a block diagram of an embodiment of a converter for converting a three primary input signal into two times three display primaries of a spectrum sequential display.

FIG. 6 schematically shows an example of a gamut created by two times three display primaries of a spectrum sequential display. During the frame FR1, the gamut is defined by the display primaries DP1, DP2, DP3, and during the frame FR2, the gamut is defined by the display primaries DP4, DP5, DP6.

The selection unit 10 creates out of the six display primaries DP1 to DP6 the three resulting display primaries RDi which in this example are the combined display primaries CD1, CD2 and CD3. The combined display primary CD1 is the combination of the display primaries DP1 and DP4, the combined display primary CD2 is the combination of the display primaries DP2 and DP5, and the combined display primary CD3 is the combination of the display primaries DP3 and DP6. In the example shown, the combined display primaries CDi are selected to be the average of the display primaries DPi to be combined. Thus, identical display primaries RDi, which are the resulting display primaries CD1, CD2, CD3, are selected during both frames FR1 and FR2. Consequently, the selected display primaries RDi cover the gamut defined by the combined display primaries CD1, CD2 and CD3.

The multi-primary converter 12 converts the input pixels IPi defined with respect to the three input primaries RI, GI, BI into three drive values DRi of the three resulting display primaries RDi which are the combined display primaries CD1, CD2 and CD3. Thus now, the multi-primary converter 11 performs a three to three primary conversion. The checking and allocating unit 12 checks for all the three drive values DRi whether they are within the valid range VR. For the input pixel C1 all three drive values DRi have valid values, and the drive values DRi can be fed directly to the driver 18.

However if the present input pixel IPi is not within gamut G1, but, for example is the input pixel C2, the unit 12 detects that the drive value DRi for the selected display primary CD1 is negative and allocates a fixed value FVi within the valid range VR to the combined display primary CD1. In an embodiment, the fixed value FVi is equal to zero if the drive value for the display primary CD1 is negative, or is one if the drive value for the display primary CD1 is larger than one. The unit 12 supplies the amended set of display primaries DPi' which in fact are the display primaries DPi in which the one of which the associated drive value DRi does not have a valid value VR is not selectable anymore by the selection unit 13. Thus in this example, DP1 and DP4 which are associated with the display primary CD1 are not selectable anymore because they got a fixed value FVi which, for example, is zero.

The selection unit 13 selects a sub-set of exactly four display primaries RDi' out of the selectable ones in the set DPi'. The only possibility for the selection RDi' which is left in this example of a spectrum sequential display with three primaries per frame FR1, FR2 are the four display primaries DP2, DP5, DP3 and DP6. Thus again, the selection RDi' includes the ones of the N display primaries DPi being combined into the combined display primaries CD2 and CD3, but not the display primaries DP1 and DP4 associated with the resulting drive value DRi which is outside the valid range VRi. In this example, the four selected display primaries RDi' are automatically selected such that the representation of the color of the input pixel C2 is possible.

The multi-primary converter 14 performs the multi-primary conversion under the constraint CO2 that the pairs of the N display primaries DP2, DP5 and DP3, DP6 which were combined into a combined display primary CD2 and CD3, respectively, before the first multi-primary conversion 11 have equal drive values. Alternatively, the constraint CO2 may be that the difference between the drive values is minimal, or that the difference of the resulting luminances of the sub-pixels SPi associated with the display primaries DPi is minimal. Although in this example, the four display primaries RDi' all are real display primaries DPi, in other examples wherein more than three display primaries are present per frame FR1, FR2, also one or more combinations CDi of real display primaries DPi may be present in the four display primaries RDi'. The multi-primary converter 11 supplies the drive values DRi' for the four selected display primaries RDi'. Again, any other constraint CO2 may be applied. For example a minimum degradation constraint CO2 may take care that the drive of the sub-pixels is selected such that the degradation is comparable inside and outside the gamut defined by the combined display primaries CDi. Thus, the use of the constraint CO2 improves the continuity over the borders of this gamut.

The driver 18 receives the four drive values DRi' and supplies the two times three drive values DSi to the three sub-pixels SPi of the pixel PIi The drive values DSi of the real display primaries DPi in the set of the four selected ones can be used directly for driving the corresponding sub-pixels SPi. If in the set of selected ones a combined display primary CDi is present, the value of the display primaries DPi combined in this combined display primary CDi can be calculated by using the algorithm which was used for combining. In the example shown, the drive values DSi for the display primaries DPi which were combined would be identical to the drive value DSi for the combined primary CDi. The driver 18 further receives information on which drive values DSi should get a fixed value FVi because they were not within the valid range VR.

In the spectrum sequential display the primaries are combined in pairs which correspond to the same color filter. The example discussed with respect to FIGS. 5 and 6 can also be used if more than three pairs are used, for example in a spectrum sequential display with four or more sub-pixels SPi per pixel PIi. In addition or alternatively, more than two frames may be present per field. For example, if the fields comprise three frames each defined by three display primaries, a total of 9 primaries defining three different gamuts is present.

If the response of the display pixels PIi is relatively slow (for example 5 ms) with respect to the duration of the frames FR1, FR2 (for example 8.3 ms), crosstalk between the pixels in the different frames FR1, FR2 occurs as flicker. Thus, it is important to keep the differences between the drive values DSi for the display primaries DPi of the pairs in the different frames as small as possible. Therefore, in an embodiment of the present invention a three to four primary multi-primary conversion 14 is used under the equal drive values constraint CO2. Or, alternatively, the constraint CO2 may be that the difference between drive values should be minimal. The algorithm searches for the selection of four of the six display primaries DPi in which the differences between the drive values DSi of all pairs are minimized, while the color of the input pixel IPi can be reproduced. Within the gamut defined by the combined display primaries CD1, CD2, CD3, the drive values DSi for the display primaries DPi of the pairs are equal. Consequently, the majority of colors can be reproduced with equal drive values for the pairs. Only very bright colors and/or very saturated colors cannot be reproduced by the combined display primaries CDi. For such colors the previously described three to four primary conversion under the minimal difference or equal drive constraint is performed to keep the drive values of the pairs as equal as possible also for these colors.

This approach not only eliminates crosstalk but also decreases motion artifacts. The two frames FR1 and FR2 are temporarily distant and carry the same spatial information if no motion compensation is implemented. This may result in appearance of two frames in different locations on the retina of the eye of the viewer. If the difference between drive values of a pair is significant, the motion artifact will be clearly visible. The artifact is less annoying if the drive values of pairs are equal or almost equal. This approach may make an expensive motion estimation superfluous.

For the six display primaries DPi (two times three) of the spectrum sequential display the color conversion is defined by the following equation wherein any XYZ color is produced by six primary drive signals of the six primaries DP1 to DP6. The transforming matrix t11 to t36 contains the color coordinates of the six display primaries DP1 to DP6.

$$\begin{bmatrix} X \\ Y \\ Z \end{bmatrix} = \begin{bmatrix} t11 & t12 & t13 & t14 & t15 & t16 \\ t21 & t22 & t23 & t24 & t25 & t26 \\ t31 & t32 & t33 & t34 & t35 & t36 \end{bmatrix} \times \begin{bmatrix} DP1 \\ DP2 \\ DP3 \\ DP4 \\ DP5 \\ DP6 \end{bmatrix}$$

This equation wherein the values of the six display primaries DP1 to DP6 have to be determined cannot be solved because only three equations having six variables are available. However, if the display primaries DP1 to DP6 are combined in pairs of adjacent display primaries $$CD1 = \frac{DP1 + DP4}{2},$$

$$CD2 = \frac{DP2 + DP5}{2},$$

$$CD3 = \frac{DP3 + DP6}{2}$$

the following three equations with three variables results:

$$\begin{bmatrix} X \\ Y \\ Z \end{bmatrix} = \begin{bmatrix} ta11 & ta12 & ta13 \\ ta21 & ta22 & ta23 \\ ta31 & ta32 & ta33 \end{bmatrix} \times \begin{bmatrix} CD1 \\ CD2 \\ CD3 \end{bmatrix}$$

Wherein ta11=(t11+t14)/2, ta12=(t12+t15)/2, ta13=(t13+t16)/2 and so on.

This equation can be solved by determining the inverse matrix $Ta^{-1}$ of the matrix Ta which comprises ta11 to ta33.

$$\begin{bmatrix} CD1 \\ CD2 \\ CD3 \end{bmatrix} = [Ta^{-1}] \times \begin{bmatrix} X \\ Y \\ Z \end{bmatrix}$$

If any of the combined display primaries CD1, CD2, CD3 has a value outside the valid range VR, the color of the input pixel IPi does not lie inside the gamut possible with these three display primaries CD1, CD2, CD3. The valid range VR is normalized to the range zero to one including the border values. For negative values the color is to saturated, for values larger than one, the color is too bright. If the solution is valid, DP1=DP4=CD1, DP2=DP5=CD2, and DP3=DP6=CD3. If the solution is invalid, a three to four primary conversion is applied under an equal drive or minimal difference constraint, which conversion can be easily performed in real time.

In the now following it is assumed that CD1<0 and that CD1 is fixed to zero. Automatically, DP1 and DP4 are also zero. Now a four primary system results with the primaries DP2, DP3, DP5 and DP6 of which the values have to be determined for the present input pixel IPi.

By way of example only, the minimal difference constraint is performed by minimizing the differences d1 and d2 which are defined as:

$d1 = (DP2-DP5)^2$ and $d2 = (DP3-DP6)^2$

This constraint can be used in an approach wherein in a four-primary system, three of the four primary drive values are expressed as a function of the fourth one as is disclosed in European Patent Application No. 05102641.7. In this approach holds:

$$\begin{bmatrix} DP2 \\ DP3 \\ DP5 \end{bmatrix} = \begin{bmatrix} CC1 \\ CC2 \\ CC3 \end{bmatrix} + \begin{bmatrix} K1 \\ K2 \\ K3 \end{bmatrix} \times DP6$$

wherein the values CC1, CC2, CC3 are defined by the color of the input sample IPi, and the factors K1, K2, K3 are defined by the coordinates of the primaries DP2, DP3, DP5 and DP6. If this latest equation is substituted into the formulas for the differences d1 and d2, then d1 and d2 represent quadratic functions of the primary DP6. Simultaneous minimization of the differences d1 and d2 can be considered as a search of the intersection point between two parabolas d1(DP6) and d2(DP6). The value of the primary DP6 at this intersection is referred to as the optimal value DP6*opt* and is for d1(DP6)= d2(DP6):

$$DP6opt = \frac{CC2 - CC3 - CC1}{1 + K1 - K2 - K3}$$

The other drive values are now determined by substituting DP6*opt* for DP6 in the equation for the primaries DP2, DP3 and DP5. Finally, the determined mapping P1=0, P2, P3, P4=0, P5, P6*opt* satisfies the constraint of minimal differences between the drive values DSi of the pairs of display primaries DPi which are not set to a fixed value FVi.

If more than one of the combined primaries CDi are outside the valid range VR, for example, CD1<0 and CD3>1, then all possibilities for selecting display primaries DPi can be tried. For example, firstly, the algorithm fixes CD1 to zero and applies a three to four primary conversion 14 with the remaining primaries DP2, DP3, DP5 and DP6. The result of the conversion provides the drive values DSi as well as the maximal difference for both d1 and d2 between the drive values DRi' of the pairs. Secondly, the algorithm fixes DP3 to one and applies the three to four primary conversion 14 for the primaries DP1, DP2, DP4 and DP5. Again the drive values DSi and the differences between drive values DSi of the pairs result. The solution which provides the minimum differences between the drive values DSi of the pairs is selected as the optimal solution.

The proposed algorithm for the multi-primary conversion can be used in many applications. The algorithm is not restricted to a specific amount of primaries and is applicable to any multi-primary conversion.

It should be noted that the above-mentioned embodiments illustrate rather than limit the invention, and that those skilled in the art will be able to design many alternative embodiments without departing from the scope of the appended claims.

Although the present invention has been elucidated with respect to hardware, the functions discussed could as well completely or partly be performed with a software algorithm. The software algorithm may run on a dedicated processor or on a suitably programmed general purpose processor.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of converting an input pixel (IPi) defined by three values (ri, gi, bi) of input primaries (RI, GI, BI) into N drive values (DSi) for driving N sub-pixels (SPi) of a pixel (PIi) of a display device (DD), the N drive values (DSi) having a valid range (VR) wherein their values occur, the N sub-pixels (SPi) emitting light defined by N display primaries (DPi) of which at least four are independent, the method comprises:

combining ones of the N display primaries (Dpi) into a combined display primary (CDi);
   replacing the ones of the N display primaries (Dpi) which are combined by the combined display primary (CDi) to obtain M resulting display primaries (RDi);
   performing a first multi-primary conversion (MPC1), being a three to M multi-primary conversion, on the input pixel (IPi) to obtain resulting drive values (DRi) for the M resulting display primaries (RDi);
   checking whether the M resulting drive values (DRi) have values in the valid range (VR), and if the resulting drive value (DRi) of at least one of the M resulting display primaries (RDi) has a value outside the valid range (VR);

allocating a fixed value (FVi) to the resulting drive value (DRi) outside the valid range (VR);

selecting K out of the N display primaries (DPi), the selection including the ones of the N display primaries (DPi) being combined into a combined display primary (CDi) but not the display primaries (DPi) associated with the resulting drive value (DRi) outside the valid range (VR), wherein the integer K is larger than 3; and performing a second multi-primary conversion, being a three to K multi-primary conversion, under a constraint (CO2) for the ones of the N display primaries (DPi) being combined into a combined display primary (CDi) in the first multi-primary conversion (MPC1), the constraint (CO2) being selected to decrease discontinuities at borders of gamuts defined by the K display primaries.

2. The method as claimed in claim 1, wherein the second multi-primary conversion is performed under the constraint (CO2) that the ones of the N display primaries (DPi) being combined into a combined display primary (CDi) in the first multi-primary conversion (MPC1) have minimally different drive values (DRi) or cause minimal different luminances.

3. The method as claimed in claim 1, wherein the integer K equals 4.

4. The method as claimed in claim 1, wherein the using (10) of the M resulting display primaries (RDi) uses M resulting display primaries (RDi) wherein another group of ones of the N display primaries (DPi) being combined into a further combined display primary (CDi) are replaced by the further combined display primary (CDi), and wherein the selecting (13) four out of the N display primaries (DPi) include selecting the further combined display primary (CDi).

5. The method is claimed in claim 4, wherein the using of the M resulting display primaries (RDi) uses four resulting display primaries (RDi) obtained by combining a number of the N display primaries (DPi) in at least one group, and wherein the performing the first multi-primary conversion is performed under a constraint (CO1) that display primaries (DPi) contributing to a same combined display primary (CDi) have minimal different drive values (DSi) or cause minimal different luminances.

6. The method as claimed in claim 1, wherein a display field (FI) comprises a sequence of a first frame (FR1) having first display primaries (DP1, DP2, DP3) and a second frame (FR2) having second display primaries (DP4, DP5, DP6), wherein the N display primaries (DPi) comprise the first display primaries (DP1, DP2, DP3) and the second display primaries (DP4, DP5, DP6).

7. The method as claimed in claim 6, wherein a number of the first display primaries (DP1, DP2, DP3) equals a number of the second display primaries (DP4, DP5, DP6), and wherein the using M resulting display primaries (RDi) replaces the N display primaries (DPi) by N/2 resulting display primaries (RDi) by combining N/2 nearest pairs of the N display primaries (DPi).

8. The method as claimed in claim 7, wherein N is equal to six, and wherein
the using M resulting display primaries (RDi) replaces the six display primaries (DPi) by three combined display primaries (CDi), and
the performing the first multi-primary conversion converts the input pixel (IPi) to three drive values (DRi) for the three combined display primaries (CDi), (ii) checking whether the three drive values (DRi) have values in the valid range (VRi), and if at least one of the three drive values (DRi) has not a valid value:
allocating a fixed value to the invalid drive value (DRi),
selecting four out of the six display primaries (DPi), the selection does not include the display primaries (DPi) associated with the invalid drive value (DRi).

9. The method as claimed in claim 1, wherein the allocating a fixed value (FVi) allocates a nearest border value of the valid range (VR) to the drive value (DRi) outside the valid range (VR).

10. The method as claimed in claim 1, wherein the selecting selects the K primaries and 3<K<N minus the number of fixed values.

11. The method as claimed in claim 1, wherein more than one of the resulting drive values (DRi) are out of the valid range (VR) and wherein the allocating (12), the selecting and the performing is performed iteratively for each one of the resulting drive values (DRi) out of the valid range (VR) by:
allocating a fixed value (FVi) to the resulting drive value (DRi) outside the valid range (VR);
selecting K out of the N display primaries (DPi), the selection including the ones of the display primaries (DPi) being combined into the combined display primary (CDi), but not the display primaries (DPi) associated with the for this iteration selected resulting drive value (DRi) outside the valid range (VR),
performing the second multi-primary conversion with an equal drive or luminance constraint (CO2) to obtain the drive values (DRi'),
determining a difference between the drive values (DRi') of the display primaries which are combined into combined primaries (CDi), and after having performed the allocating, the selecting and the performing step for each one of the resulting drive values (DRi) out of the valid range (VR):
selecting the drive values (DRi') associated with the drive value (DRi) outside the valid range (VR) which provides the minimal difference.

12. A converter for converting an input pixel (IPi) defined by three values (ri, gi, bi) of input primaries (RI, GI, BI) into N drive values (DSi) for driving N sub-pixels (SPi) of a pixel (PIi) of a display device (DD), the N drive values (DSi) having a valid range (VR) wherein their values occur, the N sub-pixels (SPi) emitting light defined by N display primaries (DPi) of which at least four are independent, the converter comprises:
a selection unit for combining ones of the N display primaries (DPi) into a combined display primary (CDi), and for replacing the ones of the N display primaries (DPi) which are combined by the combined display primary (CDi) to obtain M resulting display primaries (RDi);
a first multi-primary converter for performing a first multi-primary conversion (MPC1), being a three to M multi-primary conversion, on the input pixel (IPi) to obtain resulting drive values (DRi) for the M resulting display primaries (RDi),
a checking and allocating unit for checking whether the M resulting drive values (DRi) have values in the valid range (VR), and if the resulting drive value (DRi) of at least one of the M resulting, display primaries (RDi) has a value outside the valid range (VR), and for allocating a fixed value (FVi) to the resulting drive value (DRi) outside the valid range (VR), a selecting unit for selecting K out of the N display primaries (DPi), the selection including the ones of the N display primaries (DPi) being combined into a combined display primary (CDi) but not the display primaries (DPi) associated with the resulting drive value (DRi) outside the valid range (VR), wherein the integer K is larger than 3, and a second multi-primary converter for performing a second multi-primary conversion, being a three to K multi-primary conversion, under a constraint (CO2) for the ones of the N display primaries (DPi) being combined into a combined display primary (CDi) in the first multi-primary conversion (MPC1), the constraint (CO2) being selected to decrease discontinuities at borders of gamuts defined by the K display primaries.

13. A non-transitory computer-readable storage medium encoded with a computer program comprising code for causing a processor to execute a method of converting an input pixel (IPi) defined by three values (ri, qi, bi) of input primaries (RI, GI, BI) into N drive values (DSi) for driving N sub-pixels (SPi) of a pixel (PIi) of a display device (DD), the N drive values (DSi) having a valid range (VR) wherein their values occur, the N sub-pixels (SPi) emitting light defined by N display primaries (DPi) of which at least four are independent, the method comprising the steps of:

combining ones of the N display primaries (DPi) into a combined display primary (CDi);

replacing the ones of the N display primaries (DPi) which are combined by the combined display primary (CDi) to obtain M resulting display primaries (RDi);

performing a first multi-primary conversion (MPC1), being a three to M multi-primary conversion, on the input pixel (IPi) to obtain resulting drive values (DRi) for the M resulting display primaries (RDi);

checking whether the M resulting drive values (DRi) have values in the valid range (VR), and if the resulting drive value (DRi) of at least one of the M resulting display primaries (RDi) has a value outside the valid range (VR);

allocating a fixed value (FVi) to the resulting drive value (DRi) outside the valid range (VR);

selecting K out of the N display primaries (DPi), the selection including the ones of the N display primaries (DPi) being combined into a combined display primary (CDi) but not the display primaries (DPi) associated with the resulting drive value (DRi) outside the valid range (VR), wherein the integer K is larger than 3; and performing a second multi-primary conversion, being a three to K multi-primary conversion, under a constraint (CO2) for the ones of the N display primaries (DPi) being combined into a combined display primary (CDi) in the first multi-primary conversion (MPC1), the constraint (CO2) being selected to decrease discontinuities at borders of gamuts defined by the K display primaries.

* * * * *